US007653024B2

(12) United States Patent
Dekorsy et al.

(10) Patent No.: US 7,653,024 B2
(45) Date of Patent: Jan. 26, 2010

(54) ALLOCATING CHANNELS IN MULTI-USER OR MULTI-SERVICE REAL-TIME TRANSMISSIONS OF WIRELESS PACKET DATA

(75) Inventors: Armin Dekorsy, Nuremberg (DE); Amanpreet Singh, Bremen (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 634 days.

(21) Appl. No.: 11/458,707

(22) Filed: Jul. 20, 2006

(65) Prior Publication Data
US 2008/0019305 A1 Jan. 24, 2008

(51) Int. Cl.
*H04W 4/00* (2009.01)
(52) U.S. Cl. .................. 370/329; 370/335; 370/208; 370/235; 370/468
(58) Field of Classification Search .................. 370/329, 370/208, 235, 468
See application file for complete search history.

(56) References Cited

U.S. PATENT DOCUMENTS

| 2003/0053413 | A1* | 3/2003 | Sawahashi et al. | 370/208 |
|---|---|---|---|---|
| 2006/0013168 | A1 | 1/2006 | Agrawal et al. | 370/335 |
| 2006/0056451 | A1 | 3/2006 | Yano et al. | 370/468 |
| 2006/0063543 | A1* | 3/2006 | Matoba et al. | 455/509 |
| 2006/0203731 | A1* | 9/2006 | Tiedemann et al. | 370/235 |
| 2006/0246916 | A1* | 11/2006 | Cheng et al. | 455/450 |

OTHER PUBLICATIONS

European Search Report mailed Oct. 31, 2007.
Cheong Yui Wong et al, "Multiuser OFDM with Adaptive Subcarrier, Bit, and Power Allocation", *IEEE Journal on Selected Areas in Communications*, IEEE Service Center, Piscataway, US; vol. 17, No. 10, Oct. 1999.

* cited by examiner

*Primary Examiner*—David Q Nguyen
(74) *Attorney, Agent, or Firm*—Williams, Morgan & Amerson, PC (57) ABSTRACT

A method and an apparatus for allocating channels in at least one of a multi-user and a multi-service environment for transmitting real-time traffic data in a wireless packet data network is provided. The method comprises determining a desired transmission rate for a first mobile station to allocate a unique frequency channel from a plurality of frequency channels to an individual user of a plurality of users. The method further comprises mapping a data stream associated with the individual user to the unique frequency channel based on the desired transmission rate for the first mobile station. A transmitter may allocate channels for transmitting real-time traffic data in a wireless communication system. The transmitter may comprise a plurality of encoders to independently encode data streams of each individual mobile station user of a plurality of mobile station users, a first resource allocator coupled to the plurality of encoders to allocate bit and power to the plurality of mobile station users, and a second resource allocator coupled to the plurality of encoders to allocate a unique frequency channel of a plurality of frequency channel to each mobile station user of the plurality of mobile station users based on at least one of channel state information and a desired transmission rate.

22 Claims, 3 Drawing Sheets

ALLOCATING CHANNELS IN MULTI-USER OR MULTI-SERVICE REAL-TIME TRANSMISSIONS OF WIRELESS PACKET DATA

FIELD OF THE INVENTION

This invention relates generally to telecommunications, and more particularly, to wireless communications.

DESCRIPTION OF THE RELATED ART

In multi-user or multi-service network environments, since many users desire access to unique services, a channel allocation technique is used to allocate channels to users for real-time traffic transmission. In many wireless communication systems, however, channel allocation may affect system performance. Channel allocation in a wireless network typically determines allocation of a channel to provide each user access to the common access medium with minimal interference to other users. For multiple users, a scheduler may provide access to the wireless network with a desired Quality of Service (QoS) for communications. For example, in a packet data network, a base station controller (BSC) or a radio network controller (RNC) may schedule reverse link (RL) or uplink (UL) communications from the mobile stations to the base stations. Alternatively, a base station may schedule forward link (FL) or downlink (DL) communications. For a data packet transmission on a downlink or forward link from a base station, a mobile station indicates a data transmission rate. In response, the base station may allocate a radio resource, such as a frequency channel and corresponding bit, power levels for the user transmission from the mobile station.

Wireless communication systems have evolved to the $3^{rd}$ generation digital multimedia systems (CDMA2000 1X and Universal Mobile Telecommunications System (UMTS)) to the high-speed data system (CDMA2000 Evolution-Data Optimized (EV-DO) and UMTS High-Speed Downlink Packet Access (HSDPA). While the $3^{rd}$ generation wireless system can support multimedia service with a desired Quality of Service (QoS), the efficiency of the $3^{rd}$ generation wireless system for robust data transmission is not that high since the system is a circuit-switching type system. On the other hand, a packet switching type high-speed data system uses efficient radio resource allocation and scheduling with radio channel awareness in the transmission. Resource allocation typically includes determining powers and/or bandwidth to optimize performance within the cell served by the base station.

While high-speed packet switching systems, including UMTS-HSDPA serve mobile communication market, the long-term evolution (LTE) of UMTS may deliver broadband wireless access to a variety of different service classes. However, resource allocation in providing broadband access with UMTS-LTE may adversely affect overall system performance when serving multiple users each having a desired QoS. Nevertheless, the growth in Internet coupled with a rapid adoption of wireless technology has led to an increasing demand for wireless packet-oriented data transmission. The wireless packet-oriented data traffic on many wireless networks may comprise a mixture of real-time traffic such as voice, multimedia teleconferencing and games, and data-traffic such as web browsing, messaging and file transfer. Such traffic characteristics in wireless communication systems may constrain system resources available for transmission when simultaneously providing diverse quality of services (QoSs).

Accordingly, in many multi-user and/or multi-service environments, the system resource may include a frequency band, a spreading code, a time slot or even a resource in space domain as well as the power with which a signal is transmitted. Thus, allocation of these resources to the users may be difficult while still being able to meets the QoS constraints given for the specific services, as desired by the different users. For example, in real-time traffic (voice, multimedia streaming etc.) transmitted via a packet-data channel where a fixed-data rate is an essential QoS constraint, an optimum resource allocation may be desired. Such resource allocation may involve allocating frequency bands (channels) to multiple real-time traffic users rather than allocating time, code or space domain units.

As an example, Orthogonal Frequency Division Multiplexing (OFDM) channels may be used for high data rate transmission in a downlink. Utilizing OFDM involves assigning bits, power and different orthogonal frequency channels to multiple users all likely to have access to the total UMTS-OFDM frequency band. In a multi-user environment, one optimal solution for the joint bit, power and channel allocation aims at fixed-rate transmission with a minimized total transmit power. It results in time-sharing of the channels amongst different users based on a sharing factor, but this joint solution is far too complex for any reasonable implementation.

Another approach divides the joint optimization into two optimization problems. One problem deals exclusively with the channel allocation while bit and power allocation is still solved jointly. For the latter optimization of bit and power allocation, a single-user greedy algorithm may be applied in a base station for HSDPA transmission. Other approaches for the channel allocation that may provide an optimum channel allocation avoid time-sharing. Although separation of the channel allocation with the bit and power allocation is less involving, this approach still results in high complexity and is therefore not suitable for many implementations.

Alternatively, several sub-optimum channel allocations allocate channels to users in a stepwise manner where for each step a set of users is created. Users belonging to this set commonly referred to as In-Set compete for the channel allocation in the corresponding step. One method usually referred to as an always include method provides an In-Set for all steps that composes all users likely to have access to the channels. In contrast, another method always excludes the user from the In-Set in the next step for whom a channel is assigned to in the current step. Such set assignments may provide a desired overall system performance, but it is difficult to determine which users should belong to the In-Set and which users should be excluded to belong in the Out-Set.

With regard to the channel allocation and the bit, power allocation, if real-time traffic is transmitted via a packet-data scheme (e.g., HSDPA, UMTS-LTE), some shortcomings of the approaches set forth above are as follows:

(1) Joint optimum resource allocation is too complex to be implemented.
(2) Separation of channel allocation from bit and power allocation may simplify the resource allocation, but optimum channel allocation is still too involved for a practical implementation.
(3) For the sub-optimum channel allocation approaches, such as Always In-/Exclude, a variation in individual fixed-rate requirements regarding transmissions of their real-time traffic data and the status of channel assignments may have further shortcomings:
   a. Significantly higher emitted power: As an example, a user that requires a high data rate may get fewer numbers of channels compared to another user with lower data rate demand. In order to compensate for the lower number of channels, substantially more power may be required, resulting in wasted power resources.

b. System capacity loss: Wasting power resources with a given maximum available power of the base station may degrade the system capacity since some real-time traffic users cannot be served anymore.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The present invention is directed to overcoming, or at least reducing, the effects of, one or more of the problems set forth above.

In one embodiment of the present invention, a method is provided for allocating channels in at least one of a multi-user and a multi-service environment for transmitting real-time traffic data in a wireless packet data network. The method comprises determining a desired transmission rate for a first mobile station to allocate a unique frequency channel from a plurality of frequency channels to an individual user of a plurality of users. The method further comprises mapping a data stream associated with the individual user to the unique frequency channel based on the desired transmission rate for the first mobile station.

In another embodiment, a transmitter is provided for allocating channels in at least one of a multi-user and a multi-service environment for transmitting real-time traffic data in a wireless communication system. The transmitter comprises a plurality of encoders to independently encode data streams of each individual mobile station user of a plurality of mobile station users, a first resource allocator coupled to the plurality of encoders to allocate bit and power to the plurality of mobile station users, and a second resource allocator coupled to the plurality of encoders to allocate a unique frequency channel of a plurality of frequency channel to each mobile station user of the plurality of mobile station users based on at least one of channel state information and a desired transmission rate.

In yet another embodiment, an article comprising a computer readable storage medium storing instructions is provided such that, when executed the instructions cause a wireless communication system to allocate channels in at least one of a multi-user and a multi-service environment for transmitting real-time traffic data in a wireless packet data network by determining a desired transmission rate for a first mobile station to allocate a unique frequency channel from a plurality of frequency channels to an individual user of a plurality of users, and map a data stream associated with the individual user to the unique frequency channel based on the desired transmission rate for the first mobile station.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which will vary from one implementation to another. Moreover, it should be appreciated that such a development effort might be complex and time-consuming, but may nevertheless be a routine undertaking for those of ordinary skill in the art having the benefit of this disclosure.

Generally, a method and an apparatus are provided for allocating channels to a plurality of users for transmitting real-time traffic data in at least one of a multi-user and a multi-service environment for transmitting real-time traffic data in a wireless packet data network. By using a transmitter at a base station or a base station router in a wireless communications system, such as a Universal Mobile Telephone System (UMTS) Long Term Evolution (LTE), first and second resource allocators may provide adaptive channel, bit and power allocation based on information about individual fixed-rate requirements of the users and the number of assigned channels to one or more active users. The method comprises determining a desired transmission rate for a first mobile station to allocate a unique frequency channel from a plurality of frequency channels to an individual user of a plurality of users. The method further comprises mapping a data stream associated with the individual user to the unique frequency channel based on the desired transmission rate for the first mobile station. The transmitter may comprise a plurality of encoders to independently encode data streams of each individual mobile station user of a plurality of mobile station users. The transmitter may further comprise a first resource allocator coupled to the plurality of encoders to allocate bit and power to the plurality of mobile station users, and a second resource allocator coupled to the plurality of encoders to allocate a unique frequency channel of a plurality of frequency channel to each mobile station user of the plurality of mobile station users based on at least one of channel state information and a desired transmission rate. By using information of an individual fixed-rate requirement of a user, the rate at which the users desire to transmit their real-time traffic data and the channels already assigned to the user may be used for deciding whether that user belongs to an In-Set that includes active users competing for the channel allocation in a next iteration step of channel allocation. Such set assignment may not only provide a desired overall system performance but indicate a rule or policy to decide which users should belong to the In-Set and which users should be excluded or belong in an Out-Set that excludes active users competing for the channel allocation in a next iteration step of channel allocation. For example, a channel allocation policy for OFDM systems that utilizes real-time traffic rate requirements may pre-calculate the maximum number of channels and define the In-Set which includes active users competing for the channel allocation in a next iteration step of channel allocation. A groupwise definition of the In-Set may be deployed and/or a relative groupwise definition of the In-Set may be used based upon the relation of the desired rates to the already assigned channels. In this way, a user that desires a high data rate may not end up with relatively less number of channels as compared to another user with a lower data rate demand. Thus, power resources may not be wasted to compensate for the lower number of channels assigned to the user indicating the high data rate demand.

Figure 1:
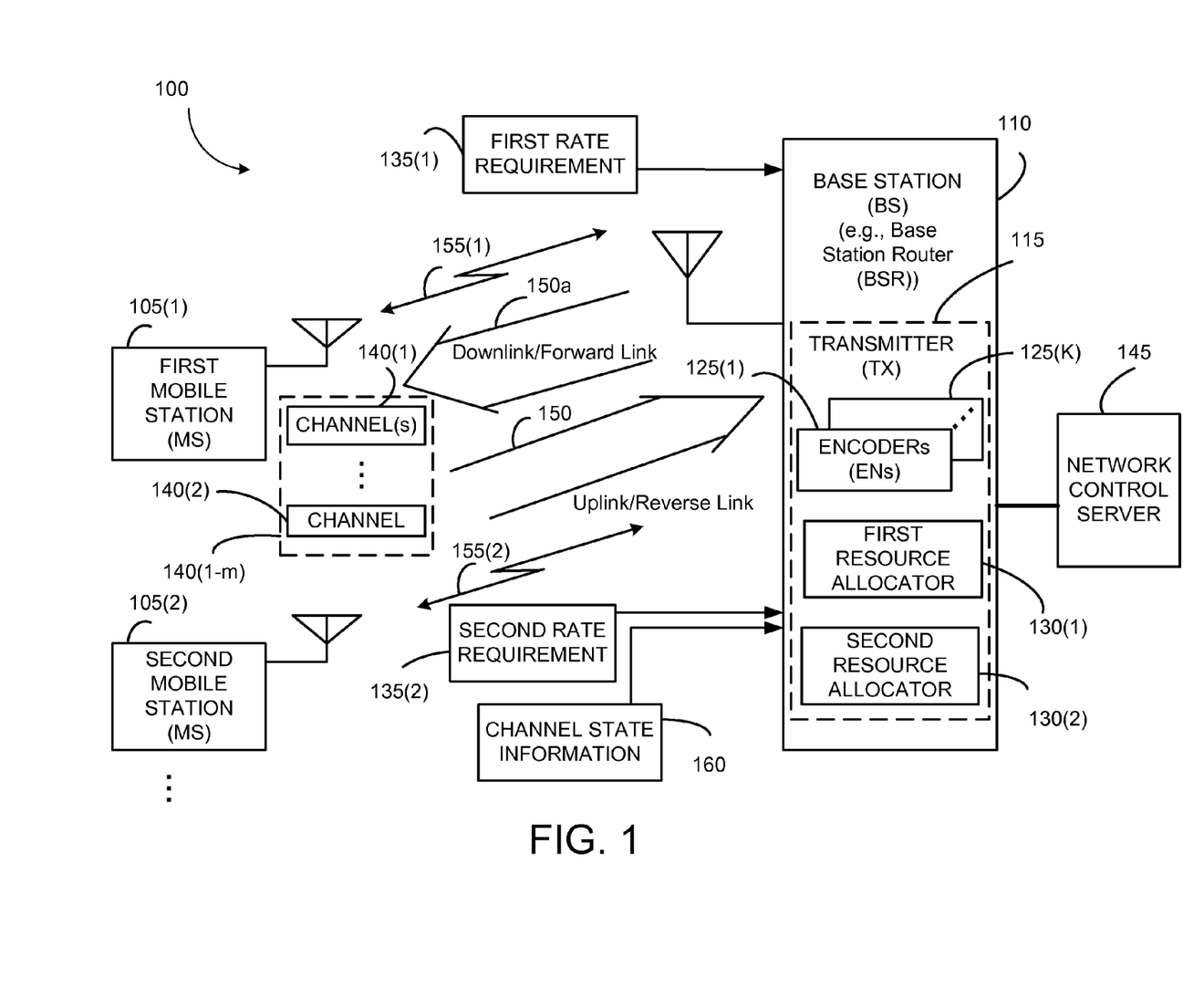
FIG. 1 schematically depicts a wireless communication system, such as a Long Term Evolution (LTE) UMTS system which includes first and second mobile stations and a base station including a transmitter for allocating channels in at least one of a multi-user and a multi-service environment for transmitting real-time traffic data in a wireless packet data network according to one illustrative embodiment of the present invention.

FIG. 1 schematically depicts a multi-channel wireless communications system, such as a Universal Mobile Telephone System (UMTS) Long Term Evolution (LTE) 100 which includes first and second mobile stations (MSs) 105(1, 2) and a base station (BS) 110 including a transmitter (TX) 115 for allocating a plurality of channels 140 (1-m) according to one illustrative embodiment of the present invention. The transmitter 115 may allocate the channels 120 (1-m) to a plurality of users in at least one of a multi-user and a multi-service environment for real-time traffic data transmissions in a relatively high-speed wireless packet data network. The transmitter 115 may comprise a plurality of encoders (ENs) 125 (1-K), first resource allocator (FRA) 130(1) and second resource allocator (SRA) 130(2) to provide an adaptive channel, bit and power allocation based on information about individual fixed-rate requirements (REQ) 135(1,2) of the users and the number of assigned channels 140(1,2) to one or more active users.

The base station 110 may service one or more of cells in which the first and second mobile stations 105(1, 2) (also known as Access Terminals (ATs), User Equipment (UE), and the like) may access the wireless packet data network and other interconnected telecommunications systems, such as a publicly switched telephone system (PSTN) and a Data network. To provide wireless connectivity to the first and second mobile stations 105(1, 2), the base station 110, in turn, may communicate with a network control server 145 that connects the cells to the UMTS Long Term Evolution system 100. The UMTS Long Term Evolution system 100 and the network control server 145 may operate according to Universal Mobile Telecommunication Services (UMTS) protocols and may implement Orthogonal Frequency Division Multiple Access (OFDMA). However, persons of ordinary skill in the art having benefit of the present disclosure should appreciate that the present invention is not limited to communication systems that operate according to UMTS-LTE or an OFDMA based communication system. In alternative embodiments, the UMTS Long Term Evolution system 100 may operate according to one or more other protocols including, but not limited to, the Global System for Mobile communication (GSM), Code Division Multiple Access (CDMA, CDMA 2000), and the like.

For illustrative purposes, the multi-channel wireless communications system of FIG. 1 is the UMTS Long Term Evolution system 100, although it should be understood that the present invention may be applicable to other systems that support data and/or voice communication. The UMTS Long Term Evolution system 100 has some similarities to a conventional UMTS system, but differs substantially with respect to the operation of the instant invention with regard to the base station 110. That is, in the UMTS Long Term Evolution system 100, the transmitter 115 may use information of an individual fixed-rate requirement of a user, the first rate requirement (REQ) 135(1) at which the user of the first mobile station 105(1) desires to transmit their real-time traffic data and the channels 140(1) that have been already assigned to that user.

The transmitter 115 may allocate a plurality of channels (CHs) 140(1-m) between the first and second mobile stations 105(1,2) within a frequency spectrum over which to communicate with the base station 110. For example, the base station 110 within range of the first mobile station 105(1) may communicate therewith over a downlink 150a. In this way, the base stations 110 may provide wireless connectivity to corresponding geographical areas or cells. By using the frequency channel 140(1), the first mobile station 105(1) may transmit the real-time traffic data at a high data rate in an uplink 150 from the first mobile station 105(1) to the base station 110.

For allocating the channels 140 separately from bit and power allocation independently to each active user, the transmitter 115 may comprise a plurality of encoders 125 (1-K), first and second resource allocators 130(1,2). The plurality of encoders 125 (1-K) may independently encode data streams of each individual mobile station 105 user of a plurality of mobile station 105 users. The first resource allocator 130(1) may be coupled to the plurality of encoders 125 (1-K) to allocate bit and power to the plurality of mobile station 105 users. The second resource allocator may be coupled to the plurality of encoders 125 (1-K) to allocate a unique frequency channel of a plurality of frequency channels to each mobile station 105 user of the plurality of mobile station 105 users based on at least one of channel state information 160 and a desired transmission rate, i.e., the rate requirement 135.

As discussed above, the base station 110 may provide wireless connectivity according to UMTS protocols and may implement OFDMA, but the base stations 110 are not limited to these protocols. In the illustrated embodiment, the base station 110 provides wireless connectivity to the first and second mobile stations 105(1,2) using OFDM channels. However, persons ordinary skill in the art having benefit of the present disclosure should appreciate that the base station 110 may provide wireless connectivity using other channels at any location within or proximate to the cells.

In operation, the base station 110 may provide the wireless connectivity to the first and second mobile stations 105(1,2) according to any desirable protocol, including a Code Division Multiple Access (CDMA, cdma2000) protocol, an Evolved Data Optimized (EVDO, 1XEVDO) protocol, a Universal Mobile Telecommunication System (UMTS) protocol, a Global System for Mobile communications (GSM)

protocol, and like. For example, the first rate requirement (REQ) 135(1) of an active user at the first mobile station 105(1,2) may very from 9.6 kbps to 153.6 kbps.

In the illustrated embodiment, real-time traffic data transmissions 155(1,2) include one or more channels within a selected frequency band, e.g., sub-carriers may be defined according to an OFDMA scheme. Persons of ordinary skill in the art should appreciate that sub-carriers may also be referred to using terms such as frequency channels, sub-channels, tones, and the like.

Examples of the first and second mobile stations 105(1,2) may include a host of wireless communication devices including, but not limited to, cellular telephones, personal digital assistants (PDAs), and global positioning systems (GPS) that operate in the high-speed wireless packet data network, such as a digital cellular CDMA network. Other examples of the first and second mobile stations 105(1,2) may include smart phones, text messaging devices, and the like.

In the UMTS Long Term Evolution system 100, the high-speed wireless packet data network may deploy any desirable protocol to enable wireless communications between the first and second base stations 105(1, 2) and the first and second mobile stations 105(1,2) according to any desirable protocol. Examples of such a protocol include a (CDMA, cdma2000) protocol, an Evolved Data Optimized (EVDO, 1XEVDO) protocol, a UMTS protocol, a GSM protocol, and like.

Other examples of such a protocol include a 1xEV-DO protocol, a UMTS protocol, a GSM protocol, and like. The 3G cellular systems based on any one of these protocols, or the like, provide enhanced voice capacity and support high data rate packet based services. As one example, these features are provided in cdma2000 1xEV high rate packet data air interface referred to as IS-856. More specifically, the 3G cellular system cdma2000 1xEV provides high-speed wireless Internet access to users with asymmetric data traffic relative to a cellular network based on IS-95 standard.

Figure 2:
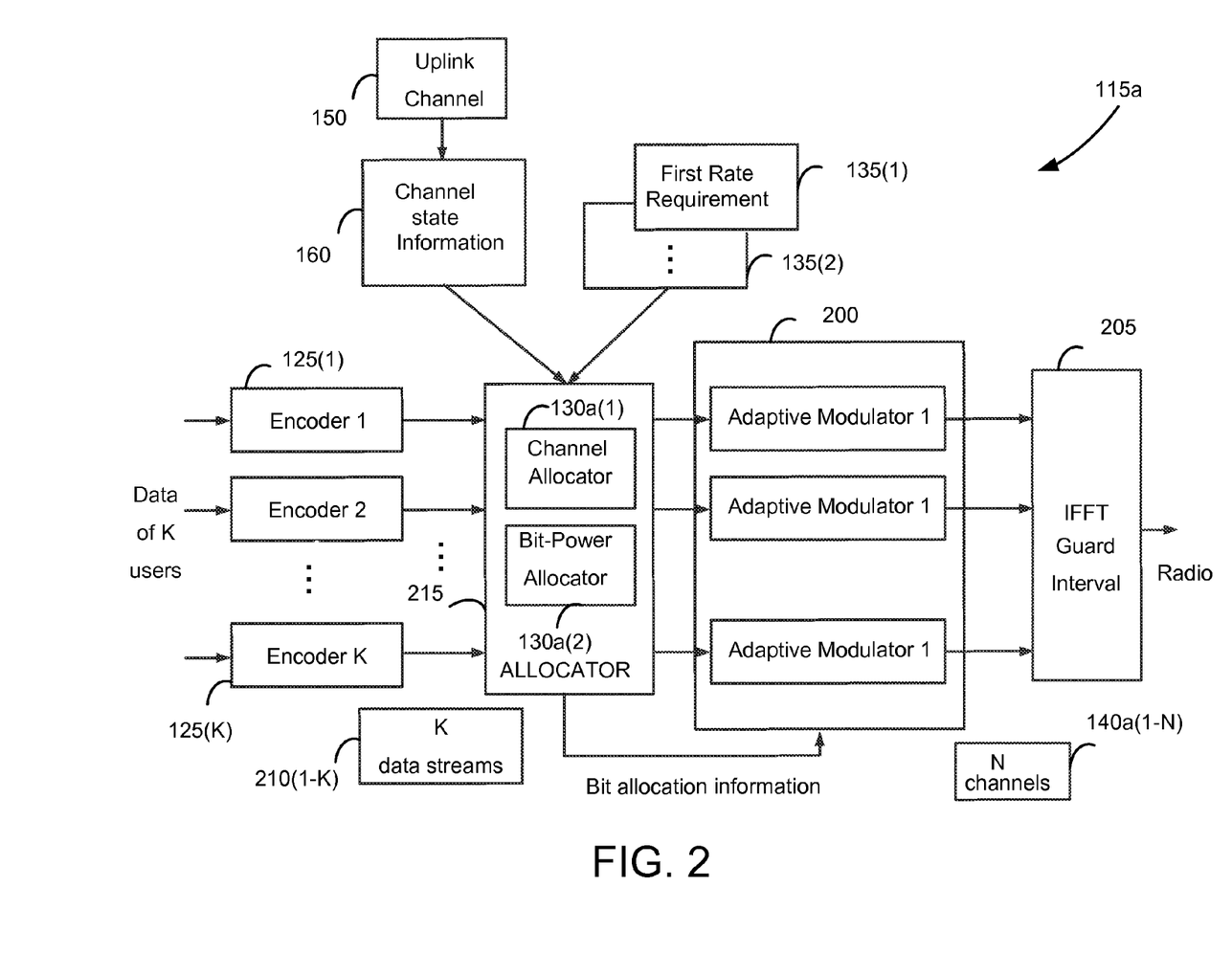
FIG. 2 schematically depicts an OFDM transmitter in which first and second resource allocators may provide adaptive channel, bit and power allocation using rate requirements for the Long Term Evolution (LTE) UMTS system shown in FIG. 1 in accordance with one illustrative embodiment of the present invention.

FIG. 2 schematically depicts an OFDM transmitter 115a in which a channel allocator 130a(1) may provide adaptive channel allocation and a bit-power allocator 130a(2) may allocate bit and power using the first and second rate requirements 135(1,2) for the Long Term Evolution (LTE) UMTS system 100 shown in FIG. 1 in accordance with one illustrative embodiment of the present invention. The OFDM transmitter 115a may comprise a plurality of modulators 200 (1-N) coupled to the channel allocator 130a(1) and the bit-power allocator 130a(2) for individually modulating a plurality of OFDM frequency channels 140a (1-N). The OFDM transmitter 115a may further comprise an Inverse Fast Fourier Transformer (IFFT) 205 to insert a guard interval in transmission of a high data rate traffic for each mobile station 105 user of the plurality of mobile station 105 users.

To transmit real-time traffic data of K users, the OFDM transmitter 115a, as shown in FIG. 2 shows, after encoding different data streams 210(1-K), the OFDM transmitter 115a may map the data streams 210(1-K) to the N>K OFDM channels 140a(1-N) sometimes also referred to as OFDM carriers. For this mapping (allocation), the OFDM transmitter 115a may use the first and second rate requirements 135(1,2) indicated by the QoS of different real-time services. An allocator 215 may allocate the K data streams 210(1-K) onto the N OFDM frequency channels 140a(1-N) based on the rate requirements 135(1,2) and the channel state information 160. The allocator 215 includes both the channel allocator 130a(1) and the bit-power allocator 130a(2). After the allocation, the plurality of modulators 200 (1-N) may process (including adaptive OFDM modulation) the different K data streams 210(1-K). Thereafter, the IFFT 205 may insert a guard inter-val in the real-time traffic data for each mobile station 105 before forwarding the packet data to a radio for transmission.

Consistent with one embodiment, to use the first and second rate requirements 135(1,2) in the allocator 215 for channel allocation, the OFDM transmitter 115a may pre-calculate a given maximum number of channels that may be assigned to a user and create the In-Set that defines which users compete for the channel allocation in the current iteration step for set-assignment.

Accordingly, the allocator 215 may pre-calculate the maximum number of channels allocated per user. As an example, for each user this pre-calculation may be included in its rate requirement in addition to the rate requirement of all the users. This pre-calculation of maximum number of channels Nk that can be allotted to the k-th user with rate requirement of $R_k$ may be performed, in an exemplary embodiment, as shown below in the following:

$$N_k = \left\lceil \frac{R_k}{R_{tot}} N \right\rceil \quad (1)$$

with $$R_{tot} = \sum_{k=1}^{K} R_k.$$

Here, K denotes the number of users and N is the total number of channels 140 available for OFDM transmission. However, any combination of the rate requirements 135(1,2) may be used in other embodiments of the present invention.

For assigning users to a set of users, in one embodiment, a set assignment process includes the rate requirement 135 of individual users in defining the set of users that compete for the channel allocation in the current iteration step. This set is referred to as an In-Set, while all the users that are excluded from the channel allocation may be grouped in an Out-Set. As used for the pre-calculation, the individual rate requirements $R_k$ of the users and the overall rate $R_{tot}$ of the Long Term Evolution (LTE) UMTS system 100 may be fixed during the channel allocation process but the total instantaneous (at i-th iteration step) number of channels allocated $N_{tot}(i)$ as well as the instantaneous number of channels per user N (k; i) allocated to different users change per iteration step. As an example, to define the In-Set the relation shown below may be used.

$$\frac{N(k, i)}{N_{tot}(i)} \leq \frac{R_k}{R_{tot}}, \quad k = 1, \ldots K. \quad (3)$$

Thus, by checking if the channel ratio of a user k at itertation step i to be either less than or equal to its rate ratio, resources may be allocated. If the channel ratio is determined to be less than its rate ratio, the allocator 215 may indicate that user k should be allocated more resources. Hence, the user k may be included in the In-Set in the next iteration step i. Otherwise, being having sufficient resources at the current state of the process, the user k is included in the Out-set.

For example, in one scenario, if a channel 140a is assigned to a user l in iteration step I, the allocator 215 may increment the instantaneous number of channels 140a(1) allocated to l-th user as well as the total instantaneous number of sub-channels using the equation as follows:

$$N(l; i+1) = N(l; i) + 1$$

$$N(k; i+1) = N(k; 1) \text{ for all } k \neq l \quad (4)$$

$$N_{tot}(i+1) = N_{tot}(i) + 1.$$

The allocator 215 may check the relation (3) for all users at each iteration step i However, users with same rate requirements being in the In-Set may compete for the available channels. Thus, in one embodiment, the allocator 215 may define the In-Set by grouping users having the same rate requirement 135. Then, the allocator 215 may check the relation (3) for each group rather than checking the relation (3) per user. By applying the relative relation (3) between the channel ratio and the rate ratio on groups may result in a significant reduction of complexity. However, such group-wise checking to build the In-Set for channel allocation may be performed in many different ways. For example, in one illustrative embodiment, the allocator 215 may follow the steps listed below:

1. Assume user k gets a channel at iteration step i.
2. Using the relation (4), update the number of channels allocated to user k as well as the total number of channels assigned.
3. If user k satisfies the relative relation (3) in the next iteration step, the user k is allowed to be a part of the In-set only if all other users of its group are in the Out-set. If even one user of the selected user's group is determined to be in the In-set, then this user may be added in the Out-set. But, when the selected user has all its group users in the Out-set, the whole group may be added back in the In-set.
4. All other groups which have all its users in the Out-set may also be checked for the relative relation (3).

In this way, by checking the relative relation (3) groupwise, the allocator 215 may provide a Relative Group Channel Assignment in one embodiment of the instant invention.

Figure 3:
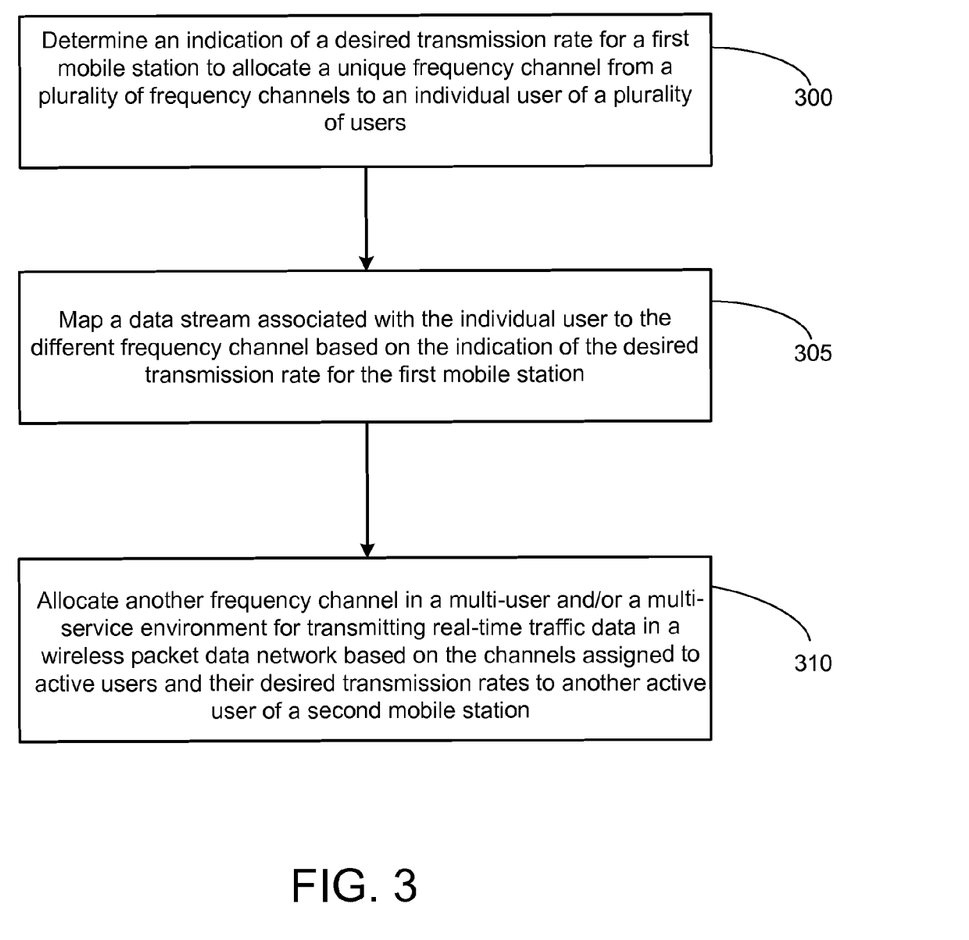
FIG. 3 depicts a stylized representation for implementing a method that may allocate channels to a plurality of users for transmitting real-time traffic data based on information about individual fixed-rate requirements of the users and the number of assigned channels to one or more active users in the wireless communications system shown in FIG. 1 consistent with an exemplary embodiment of the present invention.

FIG. 3 depicts a stylized representation for implementing a method that may allocate the OFDM frequency channels 140a(1-N) to the plurality of mobile station 105 users for transmitting real-time traffic data based on the information about individual fixed-rate requirements 135 of the users and the number of assigned channels 140a to one or more active users in the UMTS Long Term Evolution system 100 shown in FIG. 1 consistent with an exemplary embodiment of the present invention.

At block 300, the allocator 215 may determine a desired transmission rate, e.g., 135 for the first mobile station 105(1) to allocate a first OFDM frequency channel 140a(1) from the plurality of frequency channels 140a(1-N) to an individual user of the plurality of mobile station users. For example, the allocator 215 may receive the desired transmission rate in a quality of service parameter of a real-time service. By using the desired transmission rate for at least two users of the plurality of mobile station users, the allocator 215 may allot the given maximum number of channels to each user of the at least two users.

The allocator 215 may define a set of users that compete for allocation of a unique frequency channel 140a of the plurality of frequency channels 140a(1-N) in a next iteration of channel assignment. By using the desired transmission rate of an individual user of the plurality of mobile station users, the allocator 215 may determine whether to include that individual user in the set of users competing for the channel allocations in the next iteration of the channel assignment. To this end, the allocator 215 may compare a channel ratio of that individual user at a current iteration step to a rate ratio of the same individual user. If the channel ratio is determined to be less than or equal to the rate ratio, the allocator 215 may group that individual user with the set of users that compete for allocation of the unique frequency channel in the next iteration of channel assignment. Otherwise, the individual user may be grouped with another set of users that are excluded from competing for channel allocation in the next iteration of channel assignment.

At block 305, the allocator 215 may map a data stream 210(1) associated with the individual user to the unique frequency channel based on the desired transmission rate 135(1) for the first mobile station 105(1). At block 310, the allocator 215 may allocate a second OFDM frequency channel 140a(2) different than the first OFDM frequency channel 140a(1) to the second mobile station 105(2) for transmitting real-time traffic data in a wireless packet data network. The allocator 215 may allocate the second OFDM frequency channel 140a(2) based on the assigned channel to an active user, i.e., the first OFDM frequency channel 140a(1) and its desired rate requirement, i.e., the first rate requirement 135(2). The allocator 215 may allocate the second OFDM frequency channel 140a(2) based on the channel state information 160 of the uplink channel 150 between the first mobile station 105(1) associated with an individual user of the plurality of mobile station users and the base station 110.

In one embodiment, the wireless packet data network may wirelessly communicate mobile data at a speed and coverage desired by individual users or enterprises. According to one embodiment, a high-speed wireless packet data network may comprise one or more data networks, such as Internet Protocol (IP) network comprising the Internet and a public telephone system (PSTN). The 3rd generation (3G) mobile communication system, namely Universal Mobile Telecommunication System (UMTS) supports multimedia services according to 3rd Generation Partnership Project (3GPP) specifications. The UMTS adapts the Wideband Code Division Multiple Access (WCDMA) technology and includes Core Networks (CN) that are packet switched networks, e.g., IP-based networks. Because of the merging of Internet and mobile applications, the UMTS users can access both telecommunications and Internet resources. To provide an end-to-end service to users, a UMTS network may deploy a UMTS bearer service layered architecture specified by Third Generation Project Partnership (3GPP) standard. The provision of the end-to-end service is conveyed over several networks and realized by the interaction of the protocol layers.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention set forth above is described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), 802.16, Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method of allocating channels in at least one of a multi-user and a multi-service environment for transmitting real-time traffic data in a wireless packet data network, the method comprising:

determining, at a base station, a desired transmission rate for a first mobile station to allocate a unique frequency channel from a plurality of frequency channels to an individual user of a plurality of users;

defining, at the base station, a set of users that compete for allocation of said unique frequency channel of said plurality of frequency channels in a next iteration of channel assignment by:

using the desired transmission rate of said individual user of said plurality of users to determine whether to include said individual user in said set of users competing for the channel allocations in the next iteration of the channel assignment;

comparing a channel ratio of said individual user at a current iteration step to a rate ratio of said individual user; and if said channel ratio is less than or equal to said rate ratio, grouping said individual user with said set of users that compete for allocation of said unique frequency channel in the next iteration of channel assignment; and mapping, at the base station, a data stream associated with said individual user to said unique frequency channel based on the desired transmission rate for said first mobile station.

2. A method, as set forth in claim 1, wherein determining the desired transmission rate further comprises:

receiving the desired transmission rate in a quality of service parameter of a real-time service.

3. A method, as set forth in claim 1, further comprising:

allocating said unique frequency channel based on channel state information and an uplink channel between said first mobile station associated with said individual user of said plurality of users and a base station.

4. A method, as set forth in claim 3, wherein allocating said unique frequency channel farther comprises:

allocating a unique Orthogonal Frequency Division Multiplexing (OFDM) channel to said first mobile station than to a second mobile station of another user of said plurality of users for transmitting said real-time traffic data at a high data rate in a downlink from said base station to said first mobile station.

5. A method, as set forth in claim 1, further comprising:
precalculating a given maximum number of channels to be assigned to said individual user of said plurality of users.

6. A method, as set forth in claim 5, wherein precalculating a given maximum number of channels further comprises:
using the desired transmission rate for at least two users of said plurality of users to allot said given maximum number of channels to each user of said at least two users.

7. A method, as set forth in claim 1, further comprising:
if said channel ratio is more than said rate ratio, grouping said individual user with another set of users that are excluded from competing for channel allocation in the next iteration of channel assignment.

8. A method, as set forth in claim 1, further comprising:
grouping at least two users of said plurality of users together in a group to include users having the same desired transmission rates.

9. A method, as set forth in claim 8, comprising:
comparing a channel ratio of said group at a current iteration step to a rate ratio of said group; and
if said channel ratio is less than or equal to said rate ratio, including said group in a set of users that compete for allocations of said plurality of frequency channels in a next iteration of channel assignment.

10. A method, as set forth in claim 8, further comprising:
if a first user of a first user group in said plurality of users is allocated a first frequency channel of said plurality of frequency channels, updating a number of channels allocated to said first user and a total number of channels assigned to said plurality of users.

11. A method, as set forth in claim 10, further comprising:
determining whether said first user is to be included in said set of users that compete for allocation of said plurality of frequency channels in the next iteration of channel assignment;
if so, determining whether all other users of said first user group belong to another set of users that are not to compete for allocation of said plurality of frequency channels in the next iteration of channel assignment; and
if so, including said first user in said set of users that compete for allocation of said plurality of frequency channels in the next iteration of channel assignment.

12. A method, as set forth in claim 10, further comprising:
determining whether said first user group is to be included in said set of users that compete for allocation of said plurality of frequency channels in the next iteration of channel assignment;
if so, determining whether all other users of said first user group belong to another set of users that are not to compete for allocation of said plurality of frequency channels in the next iteration of channel assignment; and
if so, including said first user group in said set of users that compete for allocation of said plurality of frequency channels in the next iteration of channel assignment.

13. A method, as set forth in claim 10, further comprising:
determining whether said each user group of all other groups which have all corresponding users in another set of users that are not to compete for allocation of said plurality of frequency channels in the next iteration of channel assignment is to be included in a set of groups that compete for allocation of said plurality of frequency channels in the next iteration of channel assignment; and if so, including said each user group in said set of groups that compete for allocation of said plurality of frequency channels in the next iteration of channel assignment.

14. An article comprising a computer readable storage medium storing instructions that, when executed by a computer, cause a wireless communication system to:
allocate channels in at least one of a multi-user and a multi-service environment for transmitting real-time traffic data in a wireless packet data network by determining a desired transmission rate for a first mobile station to allocate a unique frequency channel from a plurality of frequency channels to an individual user of a plurality of users;
define a set of users that compete for allocation of said unique frequency channel of said plurality of frequency channels in a next iteration of channel assignment;
use the desired transmission rate of said individual user of said plurality of users to determine whether to include said individual user in said set of users competing for the channel allocations in the next iteration of the channel assignment;
compare a channel ratio of said individual user at a current iteration step to a rate ratio of said individual user;
if said channel ratio is less than or equal to said rate ratio, group said individual user with said set of users that compete for allocation of said unique frequency channel in the next iteration of channel assignment;
if said channel ratio is more than said rate ratio, group said individual user with another set of users that are excluded from competing for channel allocation in the next iteration of channel assignment; and
map a data stream associated with said individual user to said unique frequency channel based on the desired transmission rate for said first mobile station.

15. An article, as set forth in claim 14, comprising a medium storing instructions that, when executed cause a wireless communication system to:
receive the desired transmission rate in a quality of service parameter of a real-time service.

16. An article, as set forth in claim 14, comprising a medium storing instructions that, when executed cause a wireless communication system to:
allocate said unique frequency channel based on channel state information and an uplink channel between said first mobile station associated with said individual user of said plurality of users and a base station.

17. An article, as set forth in claim 16, comprising a medium storing instructions that, when executed cause a wireless communication system to:
allocate a unique Orthogonal Frequency Division Multiplexing (OFDM) channel to said first mobile station than to a second mobile station of another user of said plurality of users for transmitting said real-time traffic data at a high data rate in a downlink from said base station to said first mobile station.

18. An article, as set forth in claim 14, comprising a medium storing instructions that, when executed cause a wireless communication system to:
precalculate a given maximum number of channels to be assigned to said individual user of said plurality of users; and
use the desired transmission rate for at least two users of said plurality of users to allot said given maximum number of channels to each user of said at least two users.

19. An article, as set forth in claim 14, comprising a medium storing instructions that, when executed cause a wireless communication system to:

group at least two users of said plurality of users together in a group to include users having the same desired transmission rates;

compare a channel ratio of said group at a current iteration step to a rate ratio of said group; and if said channel ratio is less than or equal to said rate ratio, include said group in a set of users that compete for allocations of said plurality of frequency channels in a next iteration of channel assignment.

20. An article, as set forth in claim 19, comprising a medium storing instructions that, when executed cause a wireless communication system to:

if a first user of a first user group in said plurality of users is allocated a first frequency channel of said plurality of frequency channels, update a number of channels allocated to said first user and a total number of channels assigned to said plurality of users;

determine whether said first user is to be included in said set of users that compete for allocation of said plurality of frequency channels in the next iteration of channel assignment;

if so, determine whether all other users of said first user group belong to another set of users that are not to compete for allocation of said plurality of frequency channels in the next iteration of channel assignment; and if so, include said first user in said set of users that compete for allocation of said plurality of frequency channels in the next iteration of channel assignment.

21. An article, as set forth in claim 20, comprising a medium storing instructions that, when executed cause a wireless communication system to:

determine whether said first user group is to be included in said set of users that compete for allocation of said plurality of frequency channels in the next iteration of channel assignment;

if so, determine whether all other users of said first user group belong to another set of users that are not to compete for allocation of said plurality of frequency channels in the next iteration of channel assignment; and if so, include said first user group in said set of users that compete for allocation of said plurality of frequency channels in the next iteration of channel assignment.

22. An article, as set forth in claim 20, comprising a medium storing instructions that, when executed cause a wireless communication system to:

determine whether said each user group of all other groups which have all corresponding users in another set of users that are not to compete for allocation of said plurality of frequency channels in the next iteration of channel assignment is to be included in a set of groups that compete for allocation of said plurality of frequency channels in the next iteration of channel assignment; and if so, include said each user group in said set of groups that compete for allocation of said plurality of frequency channels in the next iteration of channel assignment.

* * * * *

UNITED STATES PATENT AND TRADEMARK OFFICE
CERTIFICATE OF CORRECTION

PATENT NO. : 7,653,024 B2
APPLICATION NO. : 11/458707
DATED : January 26, 2010
INVENTOR(S) : Dekorsy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 824 days.

Signed and Sealed this

Fourth Day of January, 2011

David J. Kappos
*Director of the United States Patent and Trademark Office*